US 6,616,800 B2

(12) United States Patent
Eriksson

(10) Patent No.: US 6,616,800 B2
(45) Date of Patent: Sep. 9, 2003

(54) METHOD AND DEVICE FOR REMOVING WINDSHIELDS

(76) Inventor: Rolf O. Eriksson, P.O. Box 48, S-791 21 Falun (SE)

( * ) Notice: Subject to any disclaimer, the term of this patent is extended or adjusted under 35 U.S.C. 154(b) by 0 days.

(21) Appl. No.: 10/092,511

(22) Filed: Mar. 5, 2002

(65) Prior Publication Data

US 2002/0121330 A1 Sep. 5, 2002

Related U.S. Application Data

(60) Provisional application No. 60/273,499, filed on Mar. 5, 2001.

(51) Int. Cl.[7] .............................................. B32B 35/00
(52) U.S. Cl. ...................... 156/344; 156/98; 156/584; 29/402.03; 29/402.08
(58) Field of Search ................... 156/94, 98, 344, 156/584; 29/402.03, 402.08

(56) References Cited

U.S. PATENT DOCUMENTS 3,298,257 A  * 1/1967 Goss ............................ 81/487
3,372,459 A  * 3/1968 Lambright ................... 156/344
3,711,677 A  * 1/1973 Cummins .................... 219/221
4,481,059 A  * 11/1984 Steck .......................... 156/254
6,543,117 B1 * 4/2003 Claycomb et al. ......... 29/426.4

* cited by examiner

Primary Examiner—Mark A. Osele
(74) Attorney, Agent, or Firm—Rolf Fasth; Fasth Law Offices

(57) ABSTRACT

A needle is inserted through the glue between a windshield and a frame surrounding the windshield. Two ends of string are inserted from an outside of the windshield to an inside thereof. One end is attached to a first hand tool so that the string forms an acute angle with the bottom end of the windshield. The end is pulled until the string cut through the windshield adhesive and moves along the edge of the windshield and forms a right angle with the edge of the windshield. The other end is attached to a second hand tool and pulled until the other end also forms a right angle. The hand tools are then moved so that the string again forms acute angles. The string is pulled until the string has been pulled along the entire circumference of the windshield and the windshield may be removed.

10 Claims, 3 Drawing Sheets

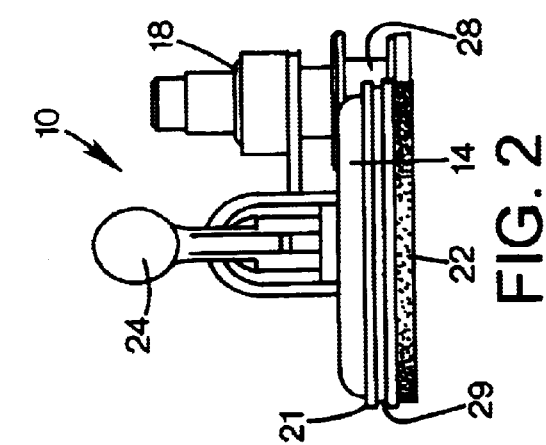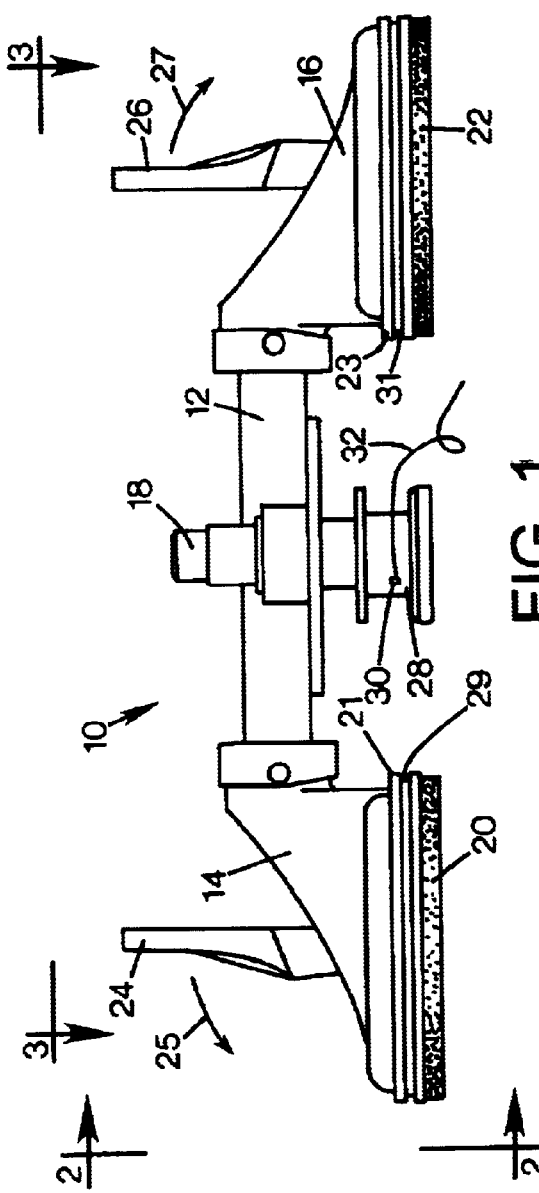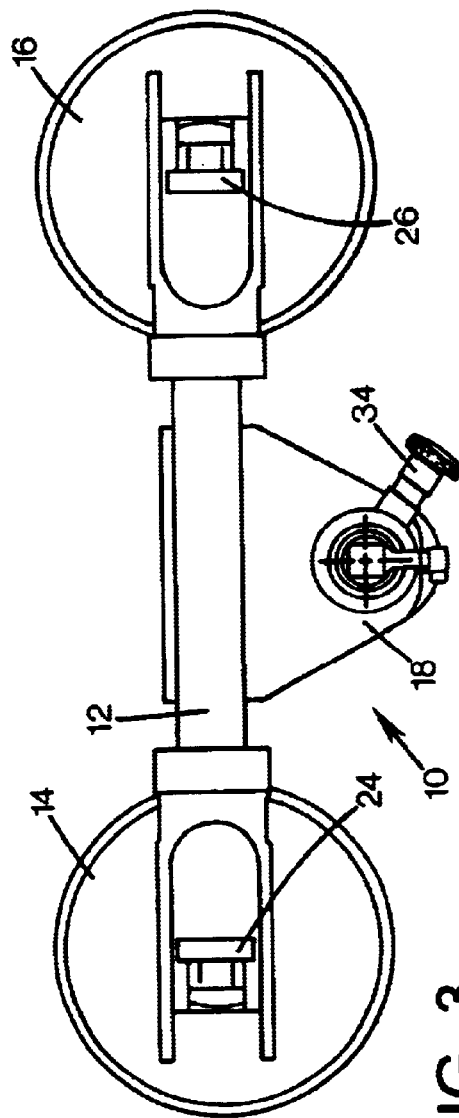

METHOD AND DEVICE FOR REMOVING WINDSHIELDS

PRIOR APPLICATION

This application is based upon U.S. Provisional Patent Application No. 60/273,499; filed Mar. 5, 2001.

TECHNICAL FIELD

The present invention relates to a method and hand tool device for removing windshields on vehicles such as automobiles.

BACKGROUND AND SUMMARY OF THE INVENTION

The removal and replacement of windshields are cumbersome and time-consuming tasks. It is often necessary for many operators to work together to be able to remove a windshield. The conventional manual methods of removing windshields often damage the paint of the automobile. This is often very costly to repair. There is a need for a more convenient and reliable method of removing windshields.

The method and device of the present invention provides a solution to the problem outlined above. More particularly, a needle is inserted through the glue between a windshield and a frame surrounding the windshield. Two ends of string are inserted from an outside of the windshield to an inside thereof. One end is attached to a first hand tool so that the string forms an acute angle with the bottom end of the windshield. The end is pulled until the string forms a right angle with the edge of the windshield. The other end is attached to a second hand tool and pulled until the other end also forms a right angle. The hand tools are then moved so that the string again forms acute angles. The string is pulled until the string has been pulled along the entire circumference of the windshield and the windshield may be removed.

BRIEF DESCRIPTION OF THE DRAWINGS

FIG. 1 is a side view of the hand tool of the present invention;

FIG. 2 is a side view along line 2—2 of FIG. 1;

FIG. 3 is a top view of the hand tool along line 3—3 of FIG. 1;

DETAILED DESCRIPTION

Figure 4:
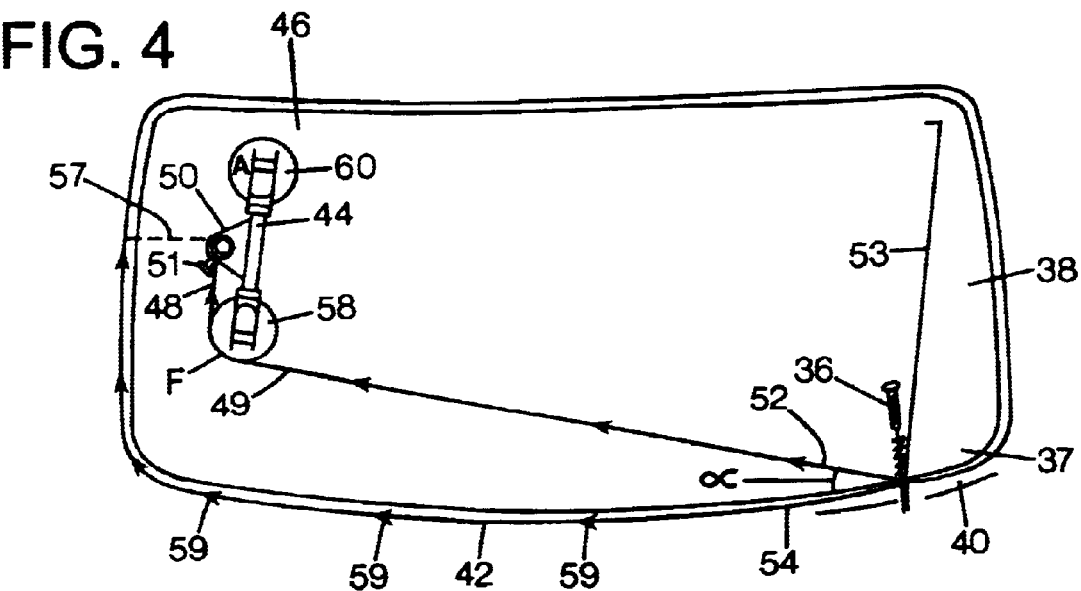
FIG. 4 is a schematic side view of a first hand tool in a starting position applied to a windshield.

With reference to FIGS. 1–8, the hand tool 10 of the present invention has an elongate handle 12 with two suction members 14, 16 attached to each end of the handle 12. A hoist mechanism 18 is attached to a mid-portion of the handle 12.

The suction members 14, 16 have round rubber suction cup segments 20, 22 and latch devices 24, 26, respectively. By engaging the devices 24, 26, i.e., pulling the devices from an upright position towards the segments into a horizontal position according to arrows 25, 27, a suction is applied to the segments 20, 22 and the segments may be firmly adhered to a smooth surface such as a windshield. The segments 20, 24 are attached to a metal discs 21, 23 that have guide grooves 29, 31, respectively, defined therein for guiding a string 32 that is attached to the hand tool 10.

more particularly, the mechanism 18 has a roller 28 for receiving and winding up the string 32 that may be inserted into an eccentrically positioned opening 30 for holding the string 32 to the roller 28 when the roller 28 is rotated. Preferably, the roller 28 is rotatable in a winding-up direction and a locking mechanism inside the mechanism 18 prevents rotation in the opposite direction. The mechanism 18 has a release button 34 for releasing the locking mechanism so that the roller 28 may also be rotated to unwind the string 32.

In operation, a hollow needle 36, as best shown in FIG. 4, is inserted between a bottom edge 37 of a windshield 38 and a frame 40 that holds the windshield 38. The windshield 38 is often glued with a polyurethane material to the frame 40. Both ends of a long string 42 are inserted from the outside into the needle 36 so that the ends are disposed on an inside of the windshield 38, such as just above the dashboard of an automobile. The string 42 may be about 6 meters long depending upon the size of the windshield 38 to be removed. One end of the string 42 is pulled further than the other end and the needle 36 is removed from the string 42. The portion of the string 42 that is outside forms a closed loop that is applied around the entire windshield 38. The user may pull a bit on both ends on the inside so that the string 42 is snugly applied around the windshield 38 on the outside thereof.

A hand tool 44 is attached to an inside of a passenger side 46 of the windshield 38 by applying the vacuum to the suction cups. A long end 48 of the string 42 is attached to the roller of a hoist mechanism 50, as described above. Preferably, the long end 48 and a section 49 of the string 42 form a right angle F as the string is guided around the suction cup 58. The hoist mechanism 50 is activated so that the tension of the string 42 is increased until an acute angle alpha is formed between an inside portion 52 of the string 42 and an outside portion 54. The cutting effectiveness is improved as long as the angle alpha is acute. When the angle is obtuse the tension forces seem to exceed the cutting forces that is less desirable.

As the tension in the string 42 is further increased the string 42 will cut through the glue between the windshield 38 and the molding 40 at the angle alpha. The string 42 is wound up on the roller of the hoist mechanism 50 until cutting point at the alpha angle between the portions 52, 54 has moved from the bottom of the driver's side to halfway up on the vertical side 56 of the passenger side 46, as indicated by a dotted line 57 and arrows 59 in FIG. 4. A tool may be attached to the string 42 at the point of the cutting to prevent damage to the interior components of the automobile.

Figure 5:
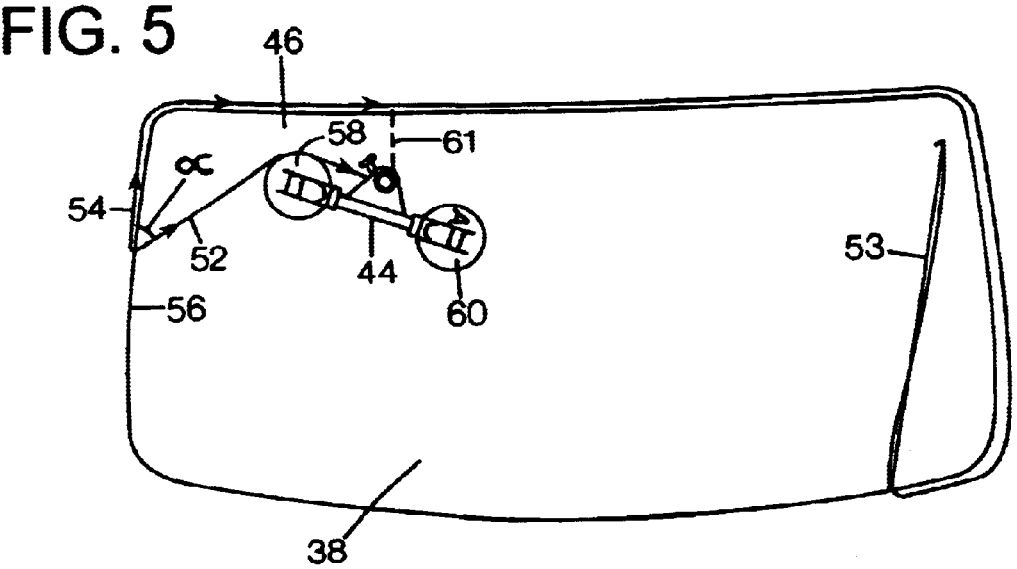
FIG. 5 is a schematic side view of the first hand tool applied to a corner position of the windshield.
Figure 6:
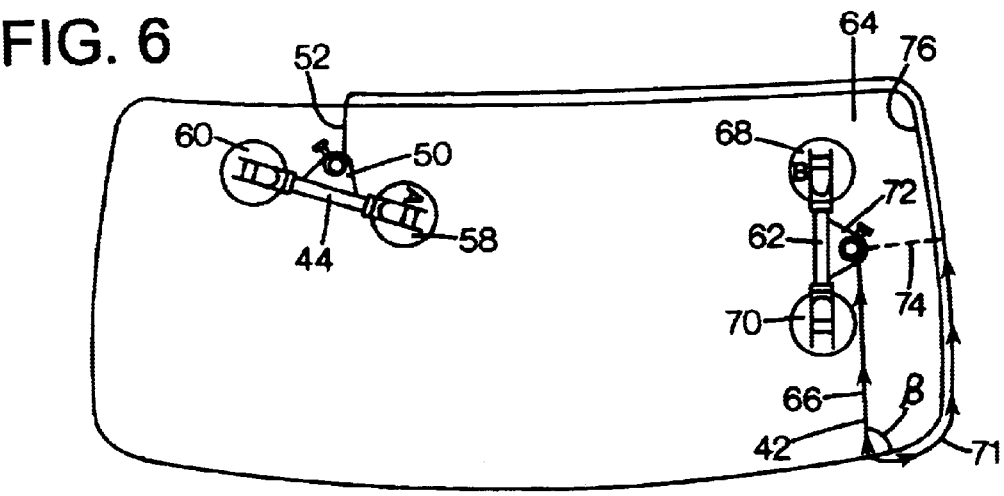
FIG. 6 is a schematic side view of the first hand tool applied to the corner position and a second hand tool applied to the windshield.

The suction cups 58, 60 are released and the lower suction cup 58 is moved upwardly, as best shown in FIG. 5, while the upper suction cup 60 is lowered and moved towards the center of the windshield 38. It may be necessary to release the locking mechanism of the hoist 50 by activating a release button 51 during movement of the hand tool. The cups 58, 60 are then adhered to the windshield. In this position, the string 42 is pulled in further by the hoist 50 until the portion 52 is substantially above the hoist 50, as shown by a dotted line 61 in FIG. 5 and FIG. 6. It is not necessary to attach the loose end 53 during the process because the string 42 is prevented from sliding along the outer edges of the windshield 38 by the friction between the glue and the string 42.

A second hand tool 62 attached vertically on a driver's side 64 of the windshield 38 is connected to the shorter end 66 of the string 42 so that an angle beta is formed between the shorter end 66 and an outside portion 71 of the string 42. The hand tool 62 has suction cups 68, 70 and a hoist mechanism 72. The shorter end 66 is pulled by the hoist mechanism 72, as described above, until the shorter end 66 moves to a position indicated by a dotted line 74 that is halfway up a vertical edge 76 of the windshield 38 on the driver's side 64.

Figure 7:
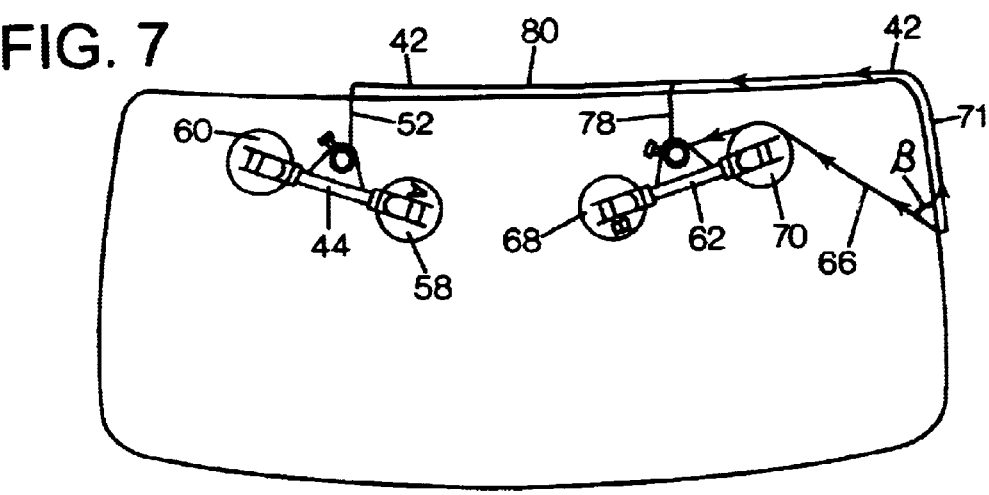
FIG. 7 is a schematic side view of the first hand tool applied to the corner position and the second hand tool applied to an upper portion of the windshield.

The cups 68, 70 are now released and moved into the position shown in FIG. 7 and the string 42 is again pulled by the hoist 72 and rolled up on a roller until the short end 66 reaches a position right above the hand tool 62 as indicated by a dotted line 78 so that only a short section 80 between the hand tools 44, 62 remains to cut through the windshield glue.

Figure 8:
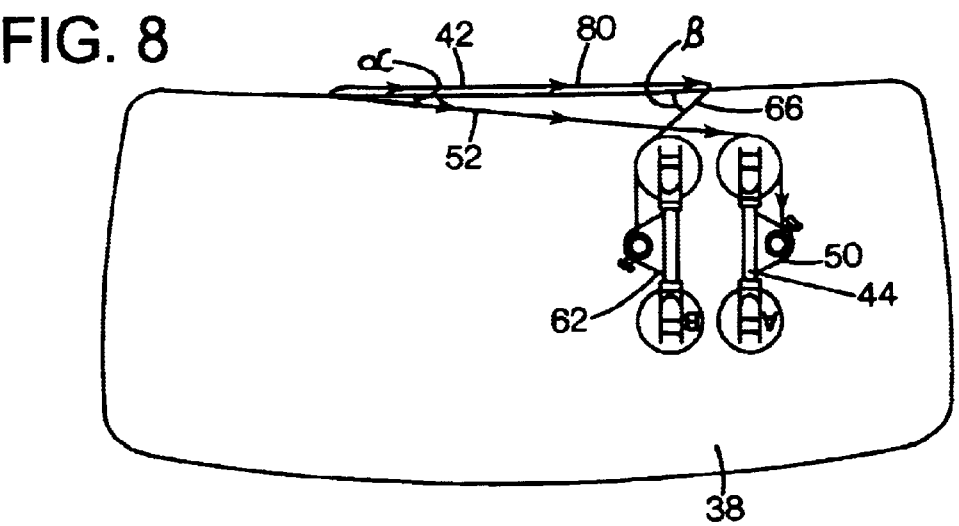
FIG. 8 is a schematic side view of the first and second hand tools in an end position applied to the windshield.

The section 80 of the string 42 is pulled through the windshield glue by moving the hand tool 62 away from the edge 76 and towards the center of the windshield 38 so that the angle beta between the short section 66 and the section 80 is acute. The hand tool 44 is then moved to a position between the hand tool 62 and the edge 76, as shown in FIG. 8, so that the angle alpha is also acute and the hand tool 44 is parallel to the hand tool 62. The hoist 50 may then be used to pull in the last remaining portion 80 of the string 42 so that the windshield 38 is only loosely resting on the molding 40.

The method and device of the present invention substantially reduces the risk of damage to the paint of the automobile when removing the windshield. The method is also ergonomically much better for the operator compared to conventional methods of removing windshields.

While the present invention has been described in accordance with preferred compositions and embodiments, it is to be understood that certain substitutions and alterations may be made thereto without departing from the spirit and scope of the following claims.

I claim:

1. A method of removing a windshield, comprising:
   a) providing a windshield disposed inside a frame and having an edge adhered to the frame with an adhesive, the windshield having an outside and an inside;
   b) inserting a member between the windshield and the frame;
   c) inserting a first end and a second end of a string from the outside of the windshield through the member to the inside of the windshield so that the string forms a loop on the outside of the windshield;
   d) applying the loop of the string along the edge of the windshield between the windshield and the frame;
   e) attaching the first end of the string to a first hoist mechanism of a first hand tool adhered to the inside of the windshield so that the first end forms an acute angle alpha with an edge of the windshield;
   f) pulling the first end of the string with the first hoist mechanism until the string cuts through the adhesive of the edge of the windshield;
   g) attaching the second end of the string to a second hoist mechanism of a second hand tool adhered to the inside of the windshield so that the first end forms an angle beta with the edge of the windshield;
   h) pulling the second end of the string until the string cuts through the adhesive of the edge of the windshield and until the string forms a right angle with the edge of the windshield;
   i) moving the second hand tool until the string forms an acute angle with the edge of the windshield; and
   j) pulling the second end of the string until the string cuts through the adhesive of the edge of the windshield and until the string forms a right angle with the edge of the windshield.

2. The method according to claim 1 wherein step f) comprises pulling the string until the string forms a right angle with the edge of the windshield.

3. The method according to claim 1 wherein the method further comprises making the first end longer than the second end.

4. The method according to claim 1 wherein the method further comprises bringing the string to a right angle at the first hand tool.

5. The method according to claim 1 wherein the method further comprises moving the second hand tool over the first hand tool and attaching the second hand tool to the inside of the windshield.

6. The method according to claim 1 wherein the step (j) further comprises moving the first hand tool over the second hand tool and attaching the first hand tool on the inside of the windshield.

7. The method according to claim 6 wherein the method further comprises moving the first hand tool until the string forms an acute angle with an upper end of the windshield.

8. The method according to claim 1 wherein the method further comprises providing the string with a length that is longer than a circumference of the windshield.

9. The method according to claim 6 wherein the method further comprises moving the first hand tool so that the first hand tool is substantially parallel to the second hand tool.

10. The method according to claim 7 wherein step (b) comprises inserting the hollow member at a lower end of the windshield.

* * * * *